United States Patent
Brosh

(10) Patent No.: US 7,421,903 B2
(45) Date of Patent: Sep. 9, 2008

(54) INTERNAL PRESSURE SIMULATOR FOR PRESSURE SENSORS

(76) Inventor: Amnon Brosh, Suite D402, 101 Ocean Ave., Santa Monica, CA (US) 90402

( * ) Notice: Subject to any disclaimer, the term of this patent is extended or adjusted under 35 U.S.C. 154(b) by 16 days.

(21) Appl. No.: 11/586,408

(22) Filed: Oct. 25, 2006

(65) Prior Publication Data

US 2007/0095146 A1 May 3, 2007

Related U.S. Application Data

(60) Provisional application No. 60/730,343, filed on Oct. 27, 2005.

(51) Int. Cl.
 *G01L 9/10* (2006.01)
(52) U.S. Cl. .................................................. 73/722
(58) Field of Classification Search .................. 73/722, 73/703, 728, 708, 735, 730, 756, 715
 See application file for complete search history.

(56) References Cited

U.S. PATENT DOCUMENTS

| | | | |
|---|---|---|---|
| 4,206,762 A * | 6/1980 | Cosman | 600/438 |
| 4,825,685 A | 5/1989 | Breimesser | 73/4 R |
| 5,398,194 A | 3/1995 | Brosh et al. | 364/483 |
| 5,639,806 A * | 6/1997 | Johnson et al. | 523/208 |
| 6,813,953 B2 * | 11/2004 | Baba et al. | 73/715 |
| 7,059,195 B1 * | 6/2006 | Liu et al. | 73/753 |

* cited by examiner

*Primary Examiner*—Jewel V Thompson
(74) *Attorney, Agent, or Firm*—Watov & Kipnes, P.C.; Kenneth Watov

(57) ABSTRACT

In oil-filled pressure sensors, the measured pressure is applied to a compliant isolation diaphragm, which causes the pressure of the internal oil to increase until it equals the external pressure. The pressure is sensed by a pressure sensing capsule, such as a MEMS piezoresistive pressure sensor. The invention incorporates an electromagnetic force generator, such as a coil and a magnetic core, within the pressure sensor in order to generate simulated pressure. When the coil is energized, the electromagnetic field creates a uniform distributed force, which moves the isolation diaphragm directly, or via an external flexure, in a manner to cause the pressure of the internal oil to increase, which is sensed by the pressure sensing capsule, which responds by producing an output signal proportional to the electromagnetic force. The simulated pressure is employed in order to perform sensor operation monitoring and self-calibration via measurement of the output signal.

25 Claims, 4 Drawing Sheets

INTERNAL PRESSURE SIMULATOR FOR PRESSURE SENSORS

RELATED APPLICATION

The present invention is related to and takes priority from co-pending Provisional Application No. 60/730,343, filed on Oct. 27, 2005, the teachings of which are incorporated herein to the extent they do not conflict herewith.

FIELD OF THE INVENTION

The present invention relates to devices useful for sensing pressure, and more particularly to a pressure sensor having a simulated pressure generator to facilitate performance testing and self-calibration.

BACKGROUND OF THE INVENTION

Pressure sensors measure pressure, typically of gases or fluids, at a point in the fluid network. Pressure sensors are used in a range of applications including, for example, medical devices and avionics. Such pressure sensors, including oil-filled pressure sensors, are manufactured and tested in the factory to ensure that they meet the mandatory specifications. The performance and/or calibration of pressure sensors must be periodically checked or tested. Unless the pressure sensors are removed and tested ex-situ, performance deterioration can result from long-term drifts, internal leaks, aging effects, standard wear and tear, and the like. Such deterioration can jeopardize overall system performance. This creates an unacceptable risk especially for critical applications in the areas of aviation, naval, automotive, medical, and the like.

Note that oil-filled sensors rely on the fact that oil is incompressible. The sensor works since the external pressure tries or attempts to move the ultra thin compliant diaphragm but the incompressible internal oil pressure increases until it matches the external pressure. Once the pressures on both sides of the diaphragm are equal there is no force compelling it to move. Any movement of the diaphragm is extremely small.

Currently, in order to verify that the pressure sensors perform within specification, the pressure sensor has to be disengaged or removed from the corresponding system for tests employing a calibrated pressure source. This form of maintenance involves disruption in service and requires costly manual labor.

Therefore, there is a need in the art for providing a pressure sensor with built-in capabilities that can perform in-situ performance testing and self-calibration. There is a further need for a pressure sensor having an internal simulated pressure generator as a built-in pressure source. Such an internal simulated pressure generator is especially suitable for use as a built-in pressure source for oil-filled pressure sensors.

SUMMARY OF THE INVENTION

The present invention relates generally to pressure sensors, preferably oil-filled pressure sensors, having a pressure generating means for facilitating performance testing and self-calibration. The pressure sensor of the present invention is designed to allow testing and self-calibration of the pressure sensor without taking it off-line or disrupting service. The pressure generating means of the present invention is constructed to fit inside reasonably sized pressure sensors, and is simple and cost effective to make and implement.

The pressure sensor of the present invention can be an oil-filled pressure sensor. The pressure sensor comprises a pressure sensing capsule, preferably in the form of a microelectromechanical system (MEMS) piezoresistive die or a capacitive sensor, enclosed in an oil-filled pressure cavity or chamber within an associated housing, a compliant isolation diaphragm normally responsive to external pressure change for changing the pressure within the pressure cavity to cause an incompressible fluid or oil media therein to conduct the pressure change to the pressure sensing capsule, and a pressure generating means for selectively generating an internal simulated pressure within the oil-filled pressure cavity within the housing. In other words, the compliant isolation diaphragm is adapted to receive an external pressure, or the combined external and simulated pressures, which are transmitted via the incompressible oil media to the pressure sensing capsule. The pressure sensing capsule senses the variation in pressure of the incompressible oil media, and produces an electrical output signal proportional to the pressure. The MEMS piezoresistive pressure sensor can be composed of suitable materials such as, for example, silicon and Pyrex™.

The pressure generating means comprises an electromagnetic coil, and an internal ferromagnetic core cooperating with the coil. An electrical current energizes the coil to generate an electromagnetic field. The electromagnetic field creates a uniform distributed force, which is applied to the isolation diaphragm directly or indirectly via a flexure disk or a plunger. This compels the pressure of the incompressible oil media to increase, thereby applying pressure to the pressure sensing capsule.

The principle of the pressure generating means is that it must apply uniform distributed force to the diaphragm that will look to the internal incompressible oil media like an external pressure, causing it to increase its pressure to counteract the electromagnetic force.

In one embodiment of the present invention, the isolation diaphragm comprises a thin ferromagnetic material such as 400 series stainless steel. The electromagnetic force compels the isolation diaphragm to be pulled towards the core. In another embodiment of the present invention, an exterior ferromagnetic flexure disk is pulled towards the core, which pushes the isolation diaphragm inward. The isolation diaphragm can comprise a non-magnetic 300 series stainless steel or magnetic foil. When the isolation diaphragm is moved inward, the pressure of the internal incompressible oil media increases to counter the force applied by the isolation diaphragm. The increase in pressure is sensed by the pressure sensing capsule, which generates an increase in the electrical output proportional to the electromagnetic force applied.

In another embodiment of the present invention, the pressure generating means comprises an external electromagnetic force apparatus such as a solenoid, coupled to the pressure sensing capsule. When the solenoid is energized, the solenoid applies a force to the isolation diaphragm, which increases the pressure of the incompressible oil media to counter the force.

It is not essential to regulate the amplitude of the simulated pressure generated by the pressure generating means for testing that involves checking operating status of the sensor, detecting internal damage such as leaks, defects and the like. However, when pressure generating means is implemented as a calibrated pressure source for self-calibration, it is important to calibrate and compensate the pressure generating means to tight tolerances over the temperature and pressure range.

In one aspect of the present invention, there is provided a pressure sensor including a pressure cavity or chamber filled with an incompressible oil, and having a compliant isolation diaphragm, wherein the improvement comprises:

electromagnetic means operable for generating an electromagnetic force for causing the isolation diaphragm to internally simulate pressure by causing the isolation diaphragm to force the incompressible fluid media to produce pressure internally having a magnitude proportional to the electromagnetic force generated.

In a further aspect of the present invention, there is provided a pressure sensor including a housing having top, bottom and side portions; a pressure cavity formed within the housing; a diaphragm configured to enclose a top portion of the pressure cavity; a pressure sensing capsule centrally located in a bottom portion of the housing within the pressure cavity; and pressure conveying means located in the pressure cavity between the diaphragm and the pressure sensing capsule; the pressure sensing capsule responding to pressure passed by the diaphragm to the pressure conveying means by converting the pressure into an electrical output signal, wherein the improvement comprises:

electromagnetic means located within the housing operable for generating an electromagnetic force to internally simulate pressure causing the pressure sensing capsule to respond by producing an electrical output signal having a magnitude proportional to the electromagnetic force generated.

In another aspect of the present invention, there is provided a method for providing self-testing and/or calibration for a pressure sensor, the method comprising the steps of:

installing externally operable pressure producing means within the pressure sensor;

operating the pressure producing means to create a controlled internal increase in pressure within the pressure sensor; and monitoring an output signal produced by the pressure sensor in response to the internal increase in pressure to determine either one or both of the proper operation and/or calibration thereof.

BRIEF DESCRIPTION OF THE DRAWINGS

The following drawings are illustrative of embodiments of the present invention and are not intended to limit the invention as encompassed by the claims forming part of the application.

DETAILED DESCRIPTION OF THE INVENTION

The present invention relates generally to pressure sensors, preferably oil-filled pressure sensors, having a pressure generating means for facilitating performance testing and self-calibration. The pressure sensor of the present invention is designed to allow testing and self-calibration of the pressure sensor without taking it off-line or disrupting service. The pressure generating means of the present invention is constructed to fit inside reasonably sized pressure sensors, and is simple and cost effective to make and implement. Typically, such sensors have cylindrical housings, but can also be square or rectangular.

The pressure sensor of the present invention is preferably an oil-filled pressure sensor. The oil-filled pressure sensor comprises a pressure sensing capsule, preferably in the form of a microelectromechanical system (MEMS) piezoresistive die or a capacitive sensor, enclosed in an oil-filled housing, a compliant isolation diaphragm operatively coupled to the pressure sensing capsule via an incompressible fluid or oil media, and a pressure generating means for generating a simulated pressure within the oil-filled housing. The compliant isolation diaphragm is adapted to receive an external pressure, which is transmitted via the incompressible oil media to the pressure sensing capsule. The pressure sensing capsule sensing the variations in pressure of the incompressible oil media, produces an electrical output signal proportional to the external pressure.

Figure 1:
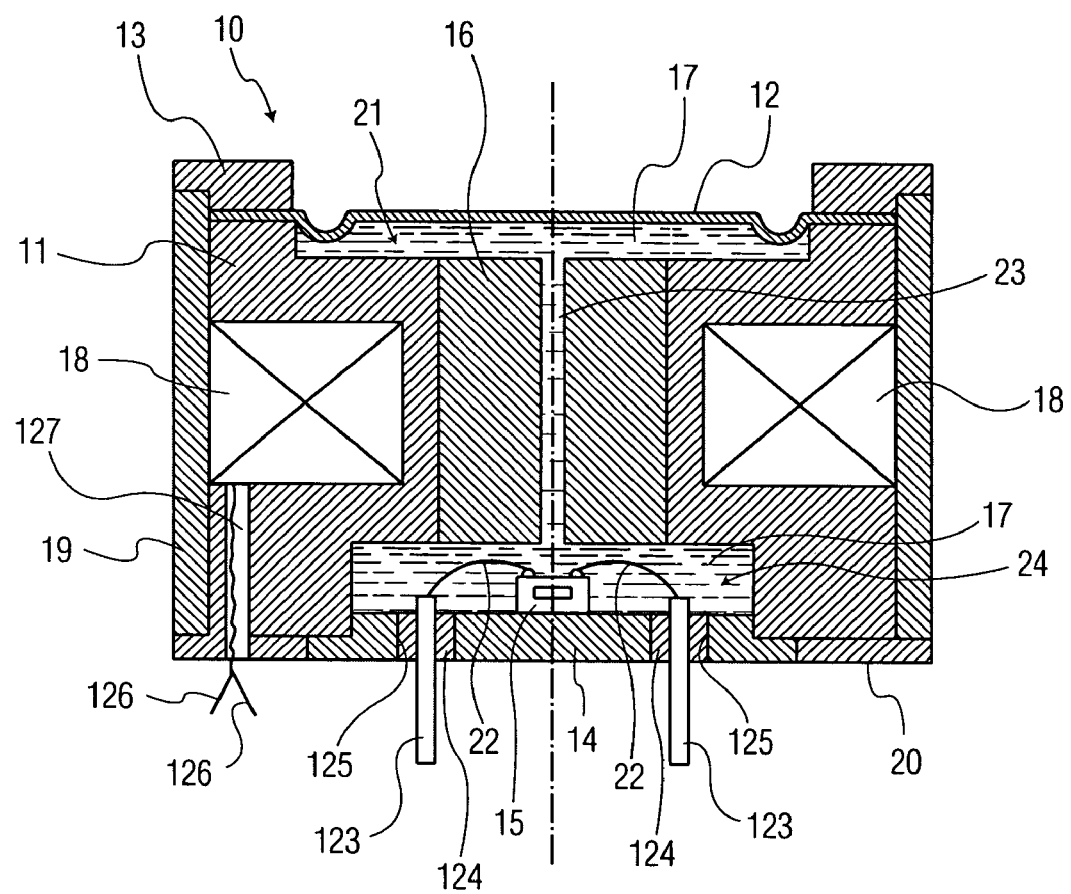
FIG. 1 shows a cross-sectional view of one embodiment of the present invention.

Referring to FIG. 1, a cross-sectional view of an oil-filled pressure sensor 10 is shown that incorporates a pressure generating means, referred hereinafter as a simulated pressure generator (SPG) 16,18 for one embodiment of the present invention. In the present embodiment, the oil-filled pressure sensor 10 includes a non-magnetic stainless steel housing 11, and a ferromagnetic core 16 positioned concentrically inside the housing 11. The ferromagnetic core 16 can be composed of a suitable ferromagnetic material such as, for example, magnetic steel or Mu-metal. Mu-metal is a nickel-iron alloy (75% nickel, 15% iron, plus copper and molybdenum) that has a very high magnetic permeability. The ferromagnetic core 16 includes a centrally located axial throughhole 23. The oil-filled pressure sensor 10 further includes a compliant ferromagnetic isolation diaphragm 12 composed of a thin foil positioned proximate to the ferromagnetic core 16, and welded in position between the housing 11 and a ferromagnetic diaphragm support 13. The isolation diaphragm 12 can be composed of a flexible, resilient material such as, for example, 400 Series Stainless such as 430, or Mu-metal. The isolation diaphragm 12 and the core 16 are separated by a small gap 21 forming a cavity therebetween filled with an incompressible fluid or oil media 17.

The pressure sensor 10 further includes a chamber 24 substantially defined by the core 16, the housing 11, and a header 14 welded in position to the housing 11. The chamber 24, gap 21, and throughhole 23 together form a pressure cavity. The header 14 can be composed of a suitable material such as, for example, Kovar or 17-4 PH. A pressure sensor die or capsule 15 supported by the header 14, occupies the pressure chamber 24. The gap 21, the throughhole 23 and the pressure chamber 24 are in fluid communication, and hermetically filled with a quantity of an incompressible oil media 17 such as, for example, silicone oil. The housing 11 is further adapted to accommodate and retain an electromagnetic coil 18. A ferromagnetic outer sleeve 19 and a ferromagnetic endplate 20 enclose the housing 11, for completing the magnetic path and acting as a magnetic shield. The outer sleeve 19, endplate 20 and the diaphragm support 13 can be composed of a ferric metal material such as, for example, 400 Series stainless steel metals.

The pressure sensor 10 operates as a conventional oil-filled pressure sensor when the coil 18 is in a de-activated or de-energized state. When an external pressure is applied to the isolation diaphragm 12, it attempts to move into the pressure cavity, thereby increasing the pressure of the incompressible oil media 17. The pressure is transmitted through the incompressible oil media 17 to pressure sensing capsule 15. The pressure sensing capsule 15 senses the pressure in the incompressible oil media 17, and in response, produces an electrical output signal proportional to the external pressure applied. The pressure sensing die 15 converts the pressure into an electrical signal between electrical leads 22 and electrically conductive pressure signal output terminals 123, passing through holes 125, and electrically insulated from the header 14 via dielectric material 124, such as glass-to-metal seals, for example.

When an electrical current is supplied to the coil 18 via electrically isolated terminals 126 extending through a conduit 127, an electromagnetic field is generated in the small gap 21 between the ferromagnetic core 16 and the isolation diaphragm 12. The electromagnetic field produces an evenly distributed force on the active area of the isolation diaphragm 12. The force causes the isolation diaphragm 12 to respond by attempting to move inwardly, thereby exerting an increased pressure on the incompressible oil media 17. The incompressible oil media 17 transmits the pressure to the pressure sensing capsule 15, which increases the output signal in response to the electromagnetic force applied. In this manner, a calibrating pressure input is internally generated to allow the pressure sensor 10 to be tested and/or calibrated without relying on an external pressure source.

Figure 2A:
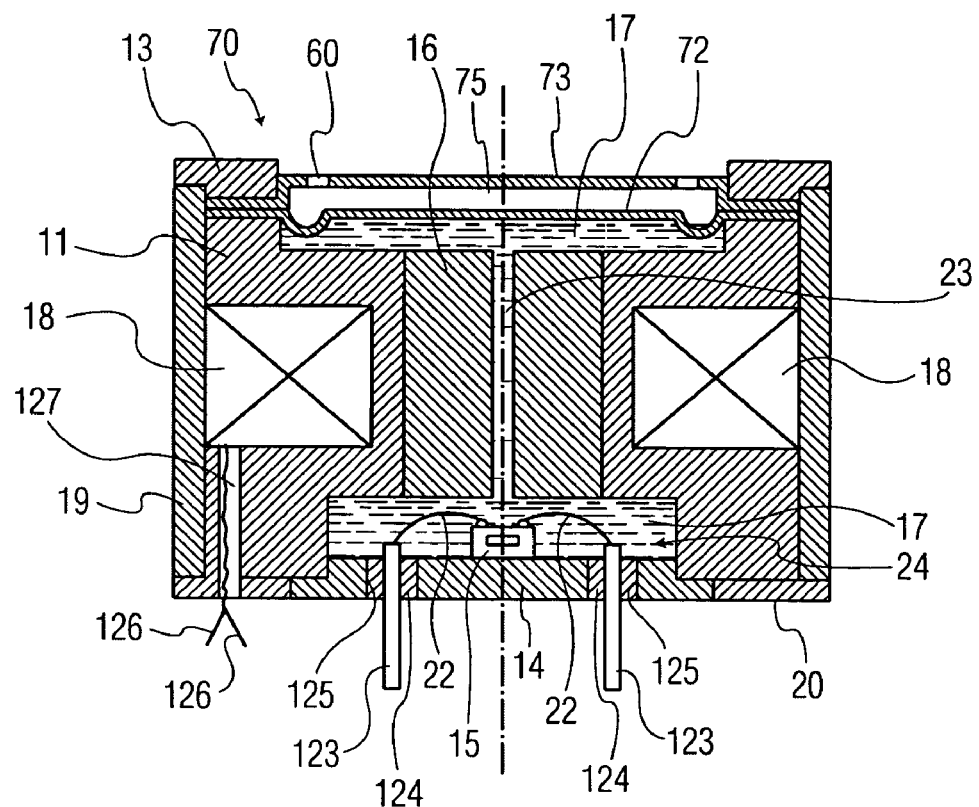
FIG. 2A shows a cross-sectional view of another embodiment of the present invention which employs an outside flexure disk in accordance with the present invention.

Referring to FIG. 2A, a cross sectional view an oil-filled pressure sensor 70 is shown incorporated with a simulated pressure generator for another embodiment of the present invention. The pressure sensor 70 comprises a non-ferromagnetic compliant isolation diaphragm 72, and a ferromagnetic flexure disk 73, which are welded between the housing 11 and the ferromagnetic diaphragm support 13. The flexure disk 73 can be composed of a suitable ferromagnetic material such as, for example, magnetic steel or 400 Series stainless such as 430 or Mu-metal.

Figure 2B:
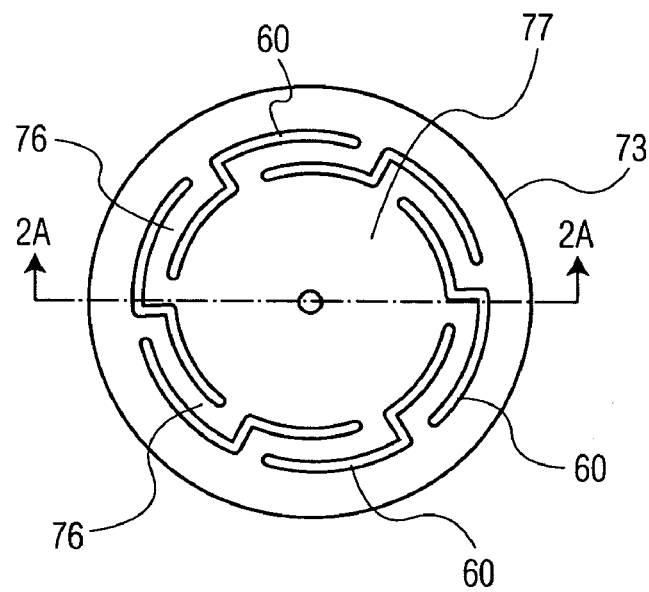
FIG. 2B shows a top view of the flexure disk of FIG. 2A in accordance with the present invention.

Referring to FIG. 2B, the flexure disk 73 comprises multiple compliant helix beams 76 configured by cutout portions 60, and operatively engaged to an integral or separate circular center plate 77. The isolation diaphragm 72 and the flexure disk 73 is preferably spaced apart by a small gap 75. In other configurations, the flexure disk 73 can be linked to the center of the isolation diaphragm 72 either directly or by means of a small spacer or nipple (not shown) formed on the isolation diaphragm 72.

When an electric current is supplied to the coil 18 via terminals 126 extending through a conduit or tubular hole 127, the energized coil 18 generates an electromagnetic field, which produces an evenly distributed magnetic force between the ferromagnetic core 16, and the flexure disk 73, including the circular center plate 77. The evenly distributed force compels the compliant helix beams 76 to bend inward as the center plate 77 moves toward the isolation diaphragm 72. Upon contact, the center plate 77 exerts a distributed force on the isolation diaphragm 72. In this manner, the generated force causes the compliant isolation diaphragm 72 to attempt to deflect inward. The internal incompressible oil media 17 pressure increases to counter the force applied on the isolation diaphragm 72 by the flexure disk 73. The increase in oil pressure is sensed by the pressure sensing capsule 15, which increases the voltage output signal in proportion to the electromagnetic force. Since the flexure disk 73 can be made from thicker foil than the isolation diaphragm 72, which must be thin, the force generated by adding the flexure disk 73 is considerably larger than the embodiment of FIG. 1 which uses the thin isolation diaphragm 17 alone.

Figure 3:
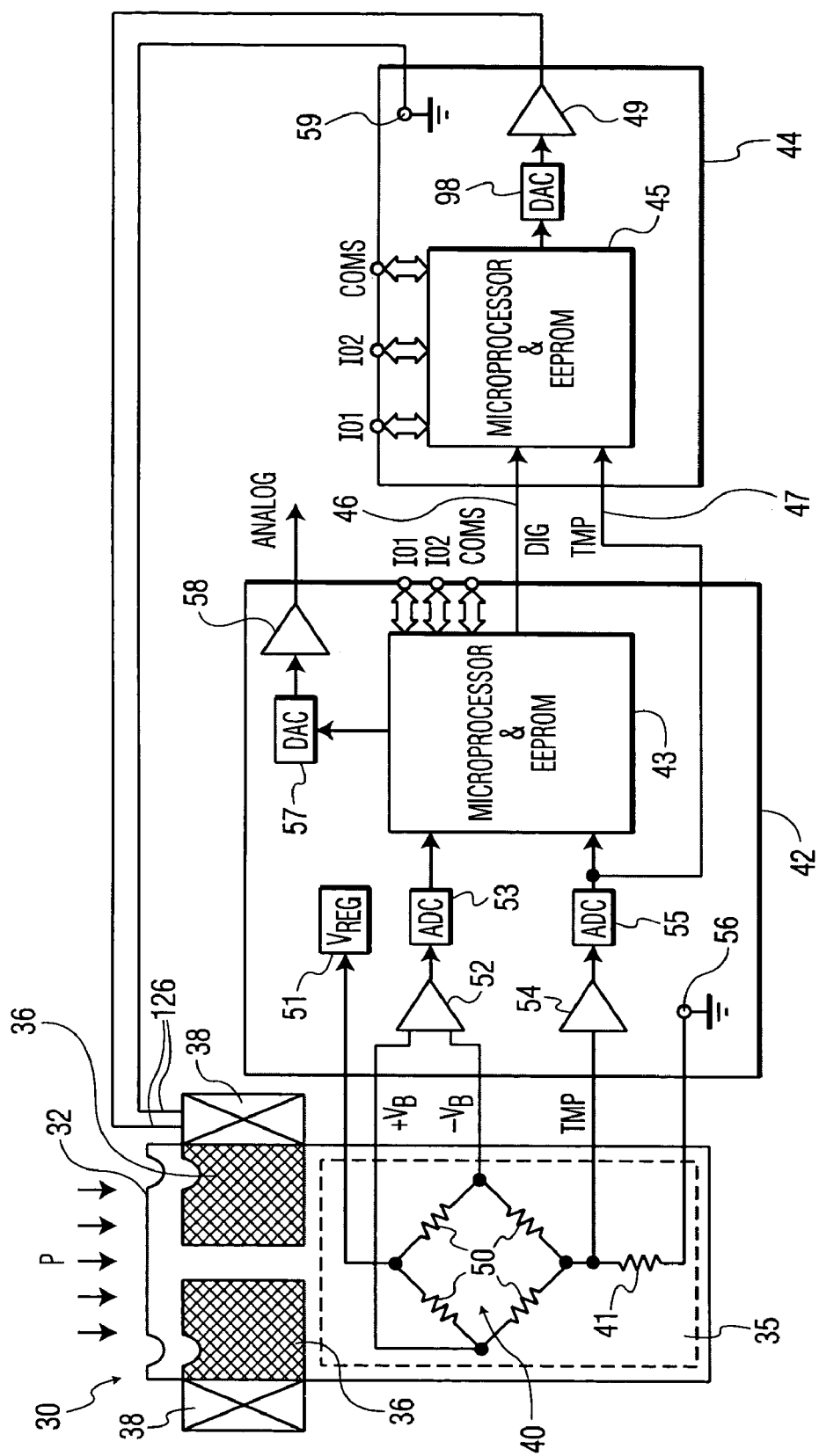
FIG. 3 shows a block diagram of a typical interface electrical circuit employed in conjunction with a pressure generating means in accordance with the present invention.

Referring to FIG. 3, the block diagram of a typical interface electrical circuit employed in an oil-filled pressure sensor, such as schematically presented pressure sensor 30, is shown that incorporates means for calibrating and thermally compensating the electromagnetic force created by a simulated pressure generator. Pressure P is applied to an isolation diaphragm 32, and is sensed by a pressure sensing capsule 35. When an electrical current is applied to a coil 38 via terminals 126, the energized coil 38 produces an electromagnetic field in a gap between a ferromagnetic core 36 and the isolation diaphragm 32. The surface of the core 36 facing the isolation diaphragm 32 can be sculptured to optimize the shape of the gap in order to create a uniform force, which serves to increase the pressure inside oil-filled pressure sensor 30.

A Wheatstone bridge 40 composed of four piezoresistors 50, and operatively associated with a temperature sensor 41 forming part of the pressure sensing capsule 35, senses the pressure applied to the isolation diaphragm 32. The piezoresistor bridge 40 and the temperature sensor 41 are connected to a programmable sensor interface 42, which employs a microprocessor and EEPROM chip 43 for performing signal conditioning of the sensor 30. The programmable sensor interface 42 also includes a voltage regulator 51 for regulating the voltage to the bridge 40, a differential amplifier 52 driving an analog-to-digital converter (ADC) 53, an operational amplifier 54 driving an ADC 55, ground terminal 56, a digital-to-analog converter (DAC) 57 and an amplifier 58. The signal conditioning operation generally comprises gain adjustment, offset control, temperature and linearity compensation. Compensation values are stored in the microprocessor and EEPROM chip 43. Bi-directional I/O 1, 2 are available. Standard Programmable Sensor Interface integrated circuits, which operate similarly to block 42, are commercially available from a number of manufacturers such as Programmable Sensor Interface MLX90308CCC, manufactured by Melexis of Concord, N.H.

The compensated sensor pressure and temperature digital outputs 46 and 47, respectively, of the programmable sensor interface 42, are transmitted to the programmable coil current interface (PCCI) 44 which includes a ground terminal 59. A microprocessor and EEPROM chip 45 employs the sensor pressure and temperature data in order to perform signal conditioning of the current fed to the coil 38. The signal conditioning of the coil current includes temperature compensation of the magnetic force resulting from ferromagnetic variations, changes in gap geometry, increase/decrease in coil resistance, and the like. Compensation and adjustment values are stored in the microprocessor and EEPROM chip 45. The digital output of microprocessor 45 is converted by a DAC 48 to an analog voltage driving an amplifier 49 for energizing the coil 38. The PCCI 44 can employ a converted standard Programmable Sensor Interface or can be designed as a special purpose application-specific integrated circuit (ASIC).

When employed for self-calibration, the simulated pressure generator produces an accurate pressure step (i.e. 10% of full scale input). In order to ensure that the simulated pressure steps remain constant throughout the full pressure range, a PCCI 44 can also be employed to calibrate the SPG (simulated pressure generator) pressure steps over the pressure range. For example, a pressure sensor designed for 0-10 PSI (pounds per square inch) full scale and a 1-PSI SPG self calibration pressure step, is calibrated at a number of pressures (for example: 0, 1, 2 and up to 10 PSI) to ensure that the SPG pressure step remains constant. This calibration test data is also stored in the microprocessor and EEPROM chip 45 and it ensures highly accurate simulated pressure steps for self-calibration, which remain constant regardless of sensor operating temperature and pressure.

PSI 42 and PCCI 44 can be implemented by manufacturing a custom current interface, and purchasing a standard Programmable Sensor Interface. Another option is to design a custom circuit, or an ASIC, which combines the functions of PSI 42 and PCCI 44, and employs the same microprocessor for handling the sensor signal conditioning of PSI 42 and the current conditioning functions of PCCI 44.

Figure 4:
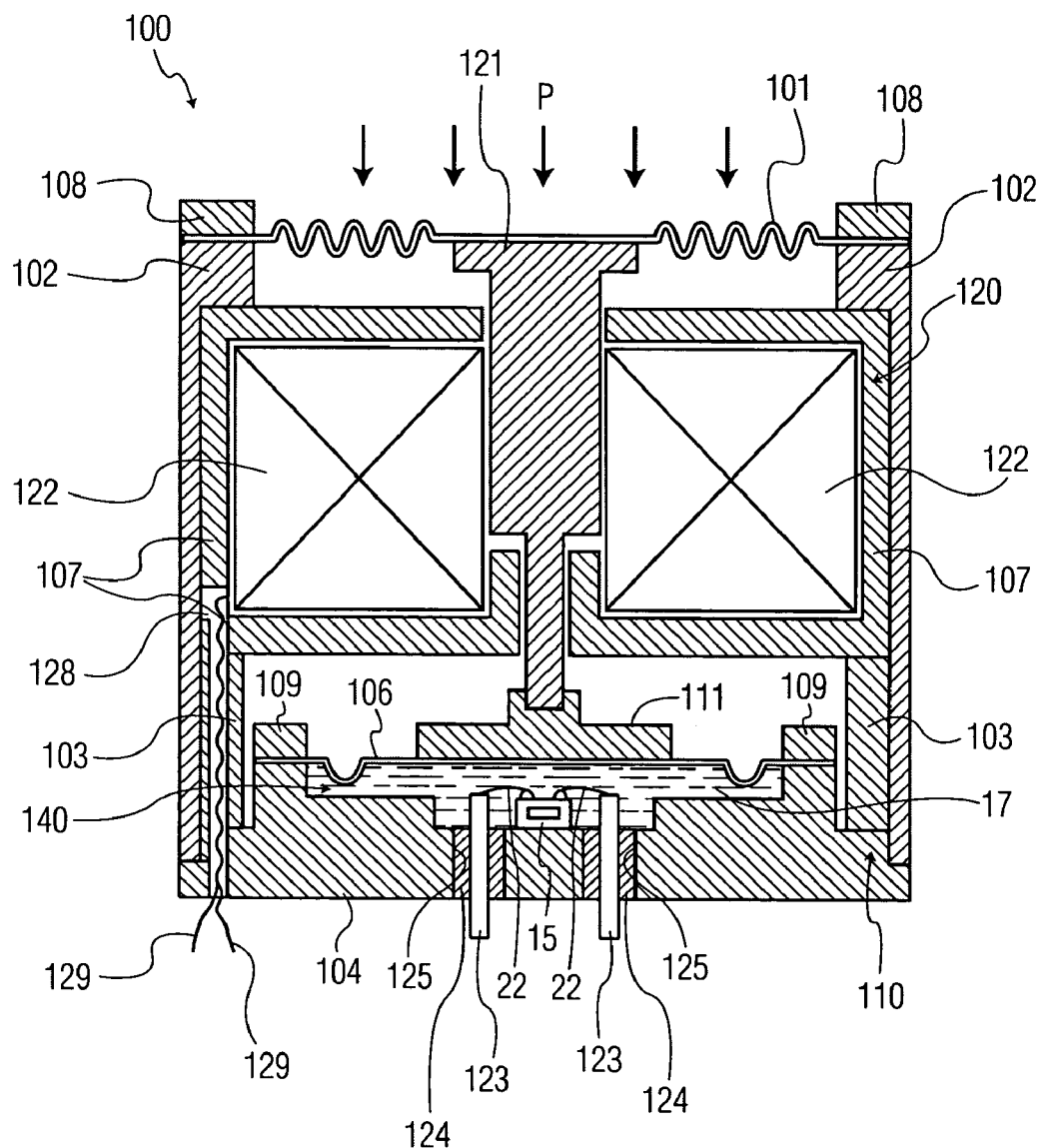
FIG. 4 shows a cross-sectional view of another embodiment of the present invention employing an external electromagnetic force generating apparatus such as a solenoid.

Referring to FIG. 4 for another embodiment of the present invention, a cross-sectional view of an oil-filled pressure sensor 100 is shown that incorporates an electromagnetic force apparatus employed to generate simulated pressure. In the shown embodiment, the pressure sensor 100 comprises an oil-filled pressure sensor assembly 110 and a solenoid style force generating device 120, which includes a solenoid coil 122, a housing 107, and a plunger 121. The plunger 121 and the housing 107 can be composed of a suitable ferromagnetic material such as, for example, magnetic steel or stainless steel.

The pressure sensor assembly 110 comprises an oil-filled pressure sensing capsule 140. The assembly 110 comprises a header 104, a pressure sensing die 15 capable of producing voltage output signal between electrical output terminals 123, an isolation diaphragm 106, and an internal incompressible fluid or oil media 17. The assembly 110 further comprises a force coupling link 111, which is attached to isolation diaphragm 106. An electromagnetic force generating device 120 operates as a "push" style solenoid. When a coil 122 is energized, the coil 122 generates a magnetic flux that causes the plunger 121 to move downward.

The pressure sensor capsule or assembly 110 and the force generating device 120 are retained in place by an outer sleeve 102 and a spacer 103 with the plunger 121 linked to the force coupling link 111. The outer sleeve 102, the spacer 103, and the force coupling link 111 can be composed of a suitable metal such as, for example, 300 Series Stainless steel. A pressure sensing diaphragm 101 is installed on the sleeve 102 via a welding ring member 108. The pressure sensing diaphragm 101 which can be composed of a metal material such as, for example, 300 Series Stainless, is attached to the plunger 121.

During normal operation, the coil 122 is de-energized. The measured pressure P is collected by the pressure sensing diaphragm 101, and converted into a mechanical force. The force is transmitted via plunger 121 and force coupling link 111 from the diaphragm 101 to the isolation diaphragm 106. The geometry of force coupling link 111 is configured to restrict the deflection of the diaphragm 106 and to interface between the force applied to the top side of the diaphragm 106 by the plunger 121 and the opposing pressure created in the internal incompressible oil media 17 on the bottom side. The pressure sensing die 15 converts the pressure into an electrical signal between the pressure signal output terminals 123, passing through holes 125. The output terminals 123 are electrically insulated from the header 104 via dielectric material 124, such as glass-to-metal seal, for example.

When an electrical current is supplied to the coil 122 via terminals 129 extending through a conduit or tubular hole 128, an electromagnetic force generated by the coil 120 pulls the plunger 121 downward, which pushes on the force coupling link 111. The electromagnetic force increases the force created by the measured pressure P. The internal incompressible oil media 17 is forced to increase its pressure in proportion to the electromagnetic force, causing an increase in the amplitude of the voltage or output signal across the output terminals 123 produced by the pressure sensing die 15.

The forgoing discussion discloses and describes merely exemplary embodiments of the present invention. One skilled in the art will readily recognize from such discussion, and from the accompanying claims, that various changes, modifications, and variations can be made therein without departing from the spirit and scope of the invention as defined in the following claims.

What is claimed is:

1. A pressure sensor including a pressure cavity or chamber filled with an incompressible fluid media, and having a compliant isolation diaphragm, wherein the improvement comprises:
    electromagnetic means operable for generating an electromagnetic force for causing said isolation diaphragm to internally simulate pressure by causing said isolation diaphragm to force the incompressible fluid media to produce pressure internally having a magnitude proportional to the electromagnetic force generated.

2. The pressure sensor of claim 1, wherein said isolation diaphragm consists of ferromagnetic material.

3. The pressure sensor of claim 1, further including:
    a pressure sensing capsule; and
    a programmable controller responsive to an output signal from said pressure sensing capsule for performing signal conditioning for said electromagnetic force.

4. The pressure sensor of claim 1, further including:
    a flexure disk positioned above said isolation diaphragm, said flexure disk being responsive to said electromagnetic force by moving to contact said isolation diaphragm for forcing the incompressible fluid media to produce pressure internally having a magnitude proportional to the electromagnetic force generated.

5. The pressure sensor of claim 4, wherein said flexure disk consists of ferromagnetic material, and said isolation diaphragm consists of non-ferromagnetic material.

6. The pressure sensor of claim 4, wherein said flexure disk includes a circular center plate portion surrounded by and operative with a plurality of cutout portions forming compliant helix beams.

7. The pressure sensor of claim 4, wherein the flexure disk is positioned on top of and linked in the center to said isolation diaphragm.

8. The pressure sensor of claim 4, wherein said flexure disk and said isolation diaphragm are linked in center portions thereof by a spacer.

9. The pressure sensor of claim 4, wherein said flexure disk and said isolation diaphragm are spaced apart.

10. The pressure sensor of claim 1, further including:
    said compliant isolation diaphragm being a first diaphragm;
    a second diaphragm spaced apart from said first diaphragm, said second diaphragm being configured for sensing external pressure;
    an axially movable plunger connected between said first and second diaphragms; and
    said electromagnetic means being further operable for generating an electromagnetic force in said plunger to contact said first diaphragm to internally simulate pressure by causing said first diaphragm to force the incompressible internal fluid media to produce pressure having a magnitude proportional to the electromagnetic force generated in said plunger.

11. The pressure sensor of claim 3, further including:
    a temperature sensor for sensing the temperature of the pressure sensor; and
    said controller including means responsive to said temperature sensor for maintaining the calibration of said electromagnetic force over a range of temperatures.

12. The pressure sensor of claim 1, wherein the incompressible fluid media is an oil.

13. A pressure sensor including a housing having top, bottom and side portions; a pressure cavity formed within said housing; a first diaphragm configured to enclose a top portion of said pressure cavity; a pressure sensing capsule centrally located in a bottom portion of said housing within said pressure cavity; and pressure conveying means located in said pressure cavity between said diaphragm and said pressure sensing capsule; said pressure sensing capsule responding to pressure passed by said diaphragm to said pressure conveying means by converting the pressure into an electrical output signal, wherein the improvement comprises:

electromagnetic means located within said housing operable for generating an electromagnetic force to internally simulate pressure causing said pressure sensing capsule to respond by producing an electrical output signal having a magnitude proportional to the electromagnetic force generated.

14. The pressure sensor of claim 13, wherein said first diaphragm consists of ferromagnetic material.

15. The pressure sensor of claim 13, further including a programmable controller responsive to said output signal from said pressure sensing capsule for performing signal conditioning for said electromagnetic force.

16. The pressure sensor of claim 13, wherein the pressure conveying means is an incompressible fluid media.

17. The pressure sensor of claim 16, wherein the fluid media is oil.

18. The pressure sensor of claim 13, wherein said electromagnetic means includes:

an electromagnetic coil; and a ferromagnetic core centrally located in the coil, said coil and core are axially aligned with said diaphragm, wherein said coil and core in an energized state, are adapted to generate an electromagnetic field to produce a force sufficient to increase the pressure in said pressure cavity by an amount measurable by said pressure sensing capsule.

19. The pressure sensor of claim 13, further including a ferromagnetic flexure disk located at the top portion of said housing above the first diaphragm, said flexure disk being responsive to said electromagnetic force to flex inward against said first diaphragm, the latter responding by attempting to move into said pressure cavity, thereby increasing the pressure on said pressure conveying means.

20. The pressure sensor of claim 19, wherein the flexure disk includes a circular center plate portion surrounded by and operative with a plurality of cutout portions forming compliant helix beams.

21. The pressure sensor of claim 19, wherein said flexure disk and first diaphragm are spaced apart.

22. The pressure sensor of claim 13, further including:

said pressure cavity being located in a lower portion of and proximate the bottom of said housing;

a second diaphragm configured to enclose a top portion of said housing;

an axially movable plunger connected between said first and second diaphragms; and said second diaphragm being further configured to attempt to move inward in response to external pressure relative to said sensor for transferring the external pressure to said first diaphragm via said plunger.

23. The pressure sensor of claim 22, wherein the electromagnetic means includes said plunger consisting of ferromagnetic material, and an electromagnetic coil extending around the plunger, wherein said coil in an energized state is adapted to generate an electromagnetic field to produce a force sufficient to cause the plunger to attempt to move downward against said first diaphragm, thereby causing the first diaphragm to attempt to move inward for transferring pressure generated by said force into the pressure conveying means in said pressure cavity.

24. The pressure sensor of claim 15, wherein said pressure sensing capsule further includes:

a temperature sensor for sensing the temperature of the pressure sensor; and said controller including means responsive to said temperature sensor for maintaining the calibration of said electromagnetic force over a range of temperatures.

25. A method for providing self-testing and/or calibration for a pressure sensor, said method comprising the steps of:

installing externally operable pressure producing means within the pressure sensor;

operating said pressure producing means to create a controlled internal increase in pressure within said pressure sensor; and monitoring an output signal produced by said pressure sensor in response to said internal increase in pressure to determine either one or both of the proper operation and/or calibration thereof.

* * * * *